Jan. 5, 1965 R. HINGST 3,164,204

METHOD AND APPARATUS FOR PREHEATING FURNACE COMBUSTION AIR

Filed Feb. 17, 1960

United States Patent Office
3,164,204
Patented Jan. 5, 1965

3,164,204
METHOD AND APPARATUS FOR PREHEATING FURNACE COMBUSTION AIR
Rudolf Hingst, deceased, late of Kassel-Wilhelmshohe, Germany, by Erika Hingst, heir and guardian of minor heir, Kassel-Wilhelmshohe, Germany, assignor to Schmidt'sche Heissdampf-Gesellschaft, Kassel-Wilhelmshohe, Germany
Filed Feb. 17, 1960, Ser. No. 9,301
Claims priority, application Germany, Feb. 18, 1959, 25,550
7 Claims. (Cl. 165—1)

This invention relates to the preheating of the combustion air for a furnace. In particular, the invention is directed to the multi-stage preheating of the combustion air for an industrial furnace such as, for example, a steam boiler plant. Waste gases flowing through the exhaust flue of the furnace are used for heating the air at an approximately uniform combustion air temperature.

The combustion air for an industrial furnace burning gas or oil is preheated for reasons of economy before being fed to the furnace burners. This conventional preheating usually takes place in several stages, each being composed of an air preheater over which the hot waste gases flow in heat exchange. The combustion air thus undergoes a first preheating in a preheater through which the air passes in countercurrent flow to the hot waste furnace gases. A second preheating stage takes place in another preheater which is closer to the entrance of the waste gases from the furnace into the flue and is therefor located at a point of higher temperature. The air flows through this second preheater in concurrent flow with the waste gases coming from the furnace and flowing through the flue. In this system, a variation in the final temperature of the combustion air as fed to the burners necessarily occurs with changes in the operating conditions for the furnace so that when the furnace is operated at full capacity the combustion air temperature is substantially higher than when the furnace operates at a small capacity. Such differences in the combustion air temperature as caused by the furnace operating conditions result in that the efficiency of the furnace and therewith the net amount of heat produced by the furnace drops considerably at small furnace capacities in view of the fact that the combustion air being fed to the furnace burners is substantially colder than its temperature when the furnace is operating at full capacity.

In another known system, the preheated combustion air is intermediately cooled by boiler feed water in a heat exchanger, and then finally heated by the hot waste furnace gases, as, for example, when changing the boiler from full to partial load.

The object of this invention is to preheat the combustion air for a furnace so that it is fed to the furnace burners at a substantially uniform temperature regardless of the conditions under which the furnace is operated.

In general, this and other objects of the invention are obtained by cooling a previously preheated combustion air with cold combustion air just before it enters the final pheheater prior to being passed to the furnace burners, the cooling being regulated according to the load conditions under which the furnace is being operated.

This enables the regulation of the final temperature of the combustion air as it is fed to the furnace burners so that the combustion air temperature can be kept nearly constant for all load operating conditions of the furnace. The result is in a substantial increase in the total net heat produced by the furnace.

A further advantage lies in that the cooling step between the first and final preheating steps is accomplished with the cold combustion air in installations lacking a liquid cooling agent or a practical feed water preheating arrangement, such as where a furnace is not equipped with a steam generator or the like. Also, this invention simplifies installations by not requiring cooling pumps and so forth.

In a further embodiment of the invention, the cooling intermediate heat exchanger is mounted immediately in front of the final air preheater so that the combustion air is cooled immediately prior to its final preheating on its may to the furnace burners.

In another form of the invention, two air cooling heat exchangers are connected in series in such a way that the incoming fresh air is first heated by heat extracted from a second air cooling fresh air cooled heat exchanger, with the latter being position immediately before the final air waste gas heated preheater for the air as it is passed to the furnace burners.

Each air cooling heat exchanger may be part of a steam boiler with the heat exchange surfaces forming a part of the water cycle of the boiler.

Each intermediate air beat exchanger thus constitutes preheaters for the feed water for the steam boiler with the feed water or a part thereof being used in a regulated quantity for the cooling medium.

In each of the above instances, the amount of cooling medium is regulated according to the load operating conditions of the furnace. This regulation can be automatic and simple. It simple requires a thermostat inserted in the waste gas flue in the area of the final preheating of the combustion air and cooling medium regulating valves responsively connected to the thermostat.

The means by which the objects of the invention are obtained are disclosed more fully with reference to the accompanying schematic drawings, in which.

Figure 1:
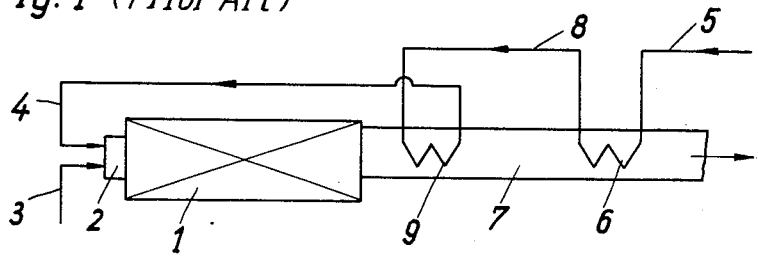
FIGURE 1 is a conventional prior art combustion air preheating system.

As shown in FIGURE 1, in the prior art, the furnace fuel, such as fuel gas or oil, is fed to furnace 1 through burner 2 from line 3, and the preheated combustion air is fed to the burner through line 4. Cold fresh combustion air is supplied by force-feed as from an unshown blower through line 5 to an initial air preheater 6 located in the flue 7 through which hot waste gases flow coming from furnace 1. The combustion air thus passes through preheater 6 in countercurrent flow to the waste gases in flue 7. From preheater 6, the combustion air flows through pipe 8 to final preheater 9 which is located immediately adjacent to the entrance of hot waste gases coming from the furnace 1 into intermediate flue 7. The air in preheater 9 flows concurrently with the flow of waste gas in flue 7. From preheater 9, the heated combustion air goes through line 4 to burner 2.

Figure 2:
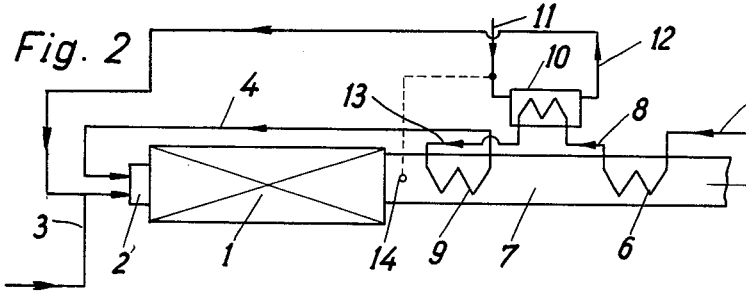
FIGURE 2 is the system of this invention utilizing an intermediate air cooling heat exchanger.

In FIGURE 2, also in the prior art, an intermediate air cooling heat exchanger is used according to this invention. The combustion air leaving preheater 6 is led through the cooling heat exchanger 10 before it flows into the final preheater 9. Heat exchanger 10 is cooled by a liquid or gaseous medium introduced through line 11 and discharged through line 12. Partially cooled air flows out of exchanger 10 through pipe 13 into final preheater 9.

In the example shown, the cooling medium may be either a part or the whole of the gas or liquid fuel being fed to burner 2. The rate of flow of the cooling medium through the heat exchanger 10 depends on the load conditions under which the furnace is being operated. The rate of flow of the cooling medium is regulated in such manner that the temperature of the combustion air passing from final preheater 9 through line 4 to burner 2 is kept at an approximately uniform level. This regulation of the flow of cooling medium through heat exchanger 10 is simply accomplished by means of a valve which is actuated in response to a thermostat 14 mounted in the flue 7 adjacent preheater 9.

Figure 3:
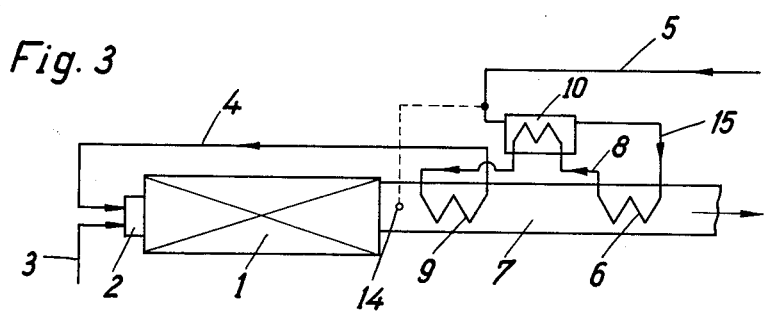
FIGURE 3 is a further modification using the cold fresh air as the cooling medium for the intermediate heat exchanger.

In FIGURE 3, the cooling medium is composed of the fresh cold combustion air or a part thereof introduced into cooling exchanger 10 through line 5. The cooling combustion air is then passed from exchanger 10 through line 15 into initial preheater 6. The combustion air flowing through pipe 8 into exchanger 10 is then given its regulated cooling and then passed through final preheater 9 and on to burner 2.

Figure 4:
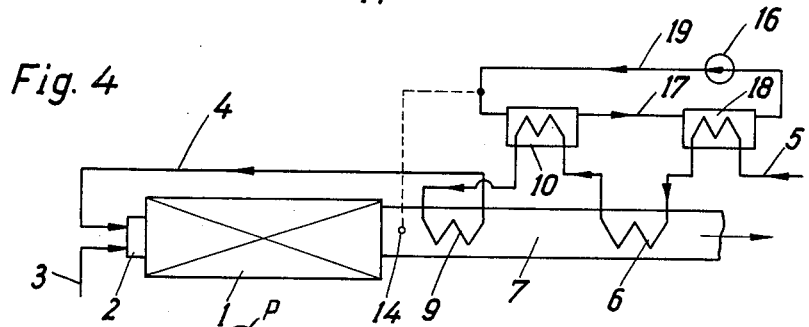
FIGURE 4 is a modification in which a plurality of intermediate air cooling heat exchangers are connected in series.

In FIGURE 4, the cooling medium is cycled between two air cooling intermediate heat exchangers. A pump 16 forces the cooling medium passing from exchanger 10 through pipe 17 into a second cooling exchanger 18 mounted in the fresh air inlet pipe 5. The cooling medium leaving exchanger 18 goes through pump 16 and is forced through line 19 back into exchanger 10. In this system, the cold combustion air is first slightly heated in exchanger 18 and then after passing through preheater 6 is cooled in exchanger 10 and then finally preheated in preheater 9. The intensity of cooling is controlled by regulating the output of pump 16 by means of thermostat 14.

Figure 5:
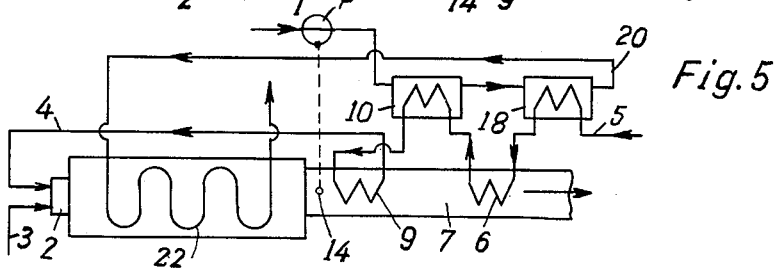
FIGURE 5 is a modification in which the intermediate air cooling heat exchangers form a part of the water cycle of a steam boiler.

In FIGURE 5, the air cooling system is a part of the water cycle of the boiler. Feed water for the furnace boiler is supplied through pump P into first heat exchanger 10 and then so heat exchanger 18 from which the feed water is led to pipe 20 to the boiler tubes 22. The exchangers 10 and 18 thus become preheaters for the feed water of the steam boiler, in which case the feed water or a part thereof is fed in a regulated amount to control the intensity of the cooling of the combustion air.

Having now described the means by which the objects of the invention are obtained,

What is claimed is:

1. A method for maintaining a substantially uniform combustion air temperature for a furnace having at least an initial air preheater and a final air preheater in the waste gas exhaust flue of the furnace, comprising cooling said combustion air outside of said flue as it flows from said initial to said final preheater by cold combustion air before said air reaches said initial air preheater with the intensity of cooling being varied according to the operating load conditions of the furnace so as to pass the combustion air at a substantially uniform temperature into the furnace.

2. A method as in claim 1, comprising indirectly cooling said combustion air with a continuously recycled cooling medium directly cooled by cold combustion gas.

3. A combustion air heating system for a furnace comprising a furnace, a waste gas flue for said furnace, an initial air preheater in said flue, a cold combustion air cooled intermediate heat exchanger outside of said flue joined to said initial preheater for partially cooling the air coming from said initial preheater, and a second air preheater in said flue and joined to said intermediate heat exchanger for reheating said air to a substantially uniform temperature.

4. A combustion air heating system as in claim 3, further comprising a fresh air heat exchanger joined to the air inlet side of said initial preheater, and means for circulating a cooling medium through said intermediate heat exchanger and said fresh air heat exchanger.

5. A combustion air heating system as in claim 4, a steam boiler in said furnace, and said cooling medium comprising the water for said boiler.

6. A combustion air heating system as in claim 5, said water comprising the feed water for said boiler.

7. A combustion air heating system for supplying combustion air at a substantially uniform temperature to a furnace operating under different load conditions comprising a furnace, a waste hot gas flue for said furnace, an initial combustion air preheater in said flue, a second combustion air preheater positioned in said flue between said initial preheater and said furnace, an intermediate combustion air heat exchanger located outwardly of said flue at a point between said first preheater and said second preheater, and pipe line means for passing fresh combustion air first through said intermediate heat exchanger, then through said initial preheater for being heated by the hot gases in said flue, then through said intermediate heater for heating the fresh combustion air while simultaneously cooling the combustion air arriving from said first preheater, and then through said second preheater for further heating by the hot gas in said flue and into said furnace.

References Cited by the Examiner

UNITED STATES PATENTS

| | | | |
|---|---|---|---|
| 1,927,215 | 9/33 | Peebles | 110—56 |
| 2,404,938 | 7/46 | Armacost et al. | |
| 2,511,647 | 6/50 | Marshall. | |
| 2,735,660 | 2/56 | Craig | 257—1.6 |
| 2,913,228 | 11/59 | Fikenscher. | |

FOREIGN PATENTS 1,046,240  12/58  Germany.

CHARLES SUKALO, *Primary Examiner.*

PERCY L. PATRICK, HERBERT L. MARTIN,
*Examiners.*